United States Patent [19]

Cheek

[11] 4,372,622
[45] Feb. 8, 1983

[54] RECIRCULATING BEARING ANTIFRICTION SYSTEM FOR WELL STRINGS

[76] Inventor: Alton E. Cheek, 1949 Vuelta Grande Ave., Long Beach, Calif. 90815

[21] Appl. No.: 207,740

[22] Filed: Nov. 17, 1980

[51] Int. Cl.³ ............................................. F16C 29/06
[52] U.S. Cl. .................................. 308/4 A; 308/6 C; 175/325
[58] Field of Search ............. 308/4 A, 6 A, 6 C, 4 R, 308/6 R, 3.8, 6 B; 175/325

[56] References Cited
U.S. PATENT DOCUMENTS

| 2,599,969 | 6/1952 | Bajulaz | 308/6 C |
| 3,298,243 | 1/1967 | Geissler et al. | 308/6 C |
| 4,206,951 | 6/1980 | Ernst et al. | 308/6 C |

Primary Examiner—Lenard A. Footland

[57] ABSTRACT

A system for minimizing frictional stress and wear between elements of a well string and a surrounding casing or other conduit containing the string. According to the invention, a generally longitudinally arranged, linear array of recirculating rollable bearing elements, preferably ball bearings, projects radially outwardly from a well string member so as to reduce primarily lineal friction. A plurality of such linear arrays of recirculating rollable bearing elements are regularly spaced about the periphery of the string at each of a series of locations along the string, and at each such location the arrays are provided in a bearing cage which may be connected to the string through annular rollable bearing means for reducing rotational friction. The bearing cages containing the linear arrays of recirculating rollable bearing elements may be mounted on separate subs or attached over the string.

4 Claims, 8 Drawing Figures

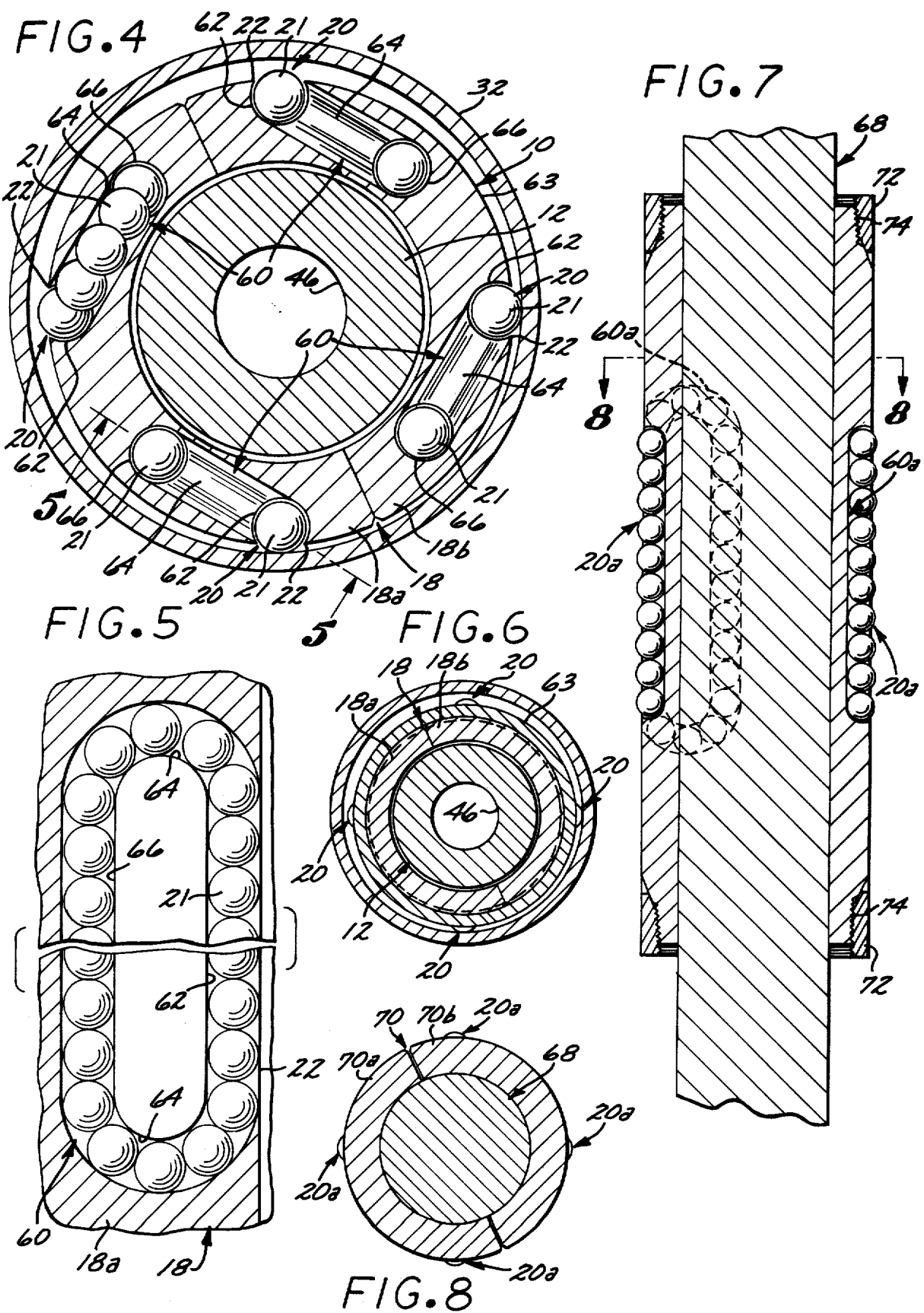

RECIRCULATING BEARING ANTIFRICTION SYSTEM FOR WELL STRINGS

BACKGROUND OF THE INVENTION

1. Field of the Invention

The invention relates to antifriction systems for reducing frictional stress and wear between well string elements and well conduits containing such strings.

2. Description of the Prior Art

Directional drilling is widely utilized today for enabling a number of wells to be drilled and serviced from a single surface station. The use of directional drilling is of particular importance in the exploitation of offshore oil fields because the manufacture, installation and maintenance of each offshore platform are tremendously expensive, and directional drilling enables a number of separate wells to be drilled and serviced from each platform.

However, the number of wells that can be drilled and serviced from a single surface site such as an offshore platform is limited by the amount of lateral displacement that can be achieved in the directional drilling, which in turn is limited by the large amounts of both rotational and longitudinal friction which are generated between the drill string and casing in deep, widely displaced wells. During the directional drilling of deep, widely displaced wells numerous bends are usually introduced by variations of both azimuth and inclination or drift angle endeavoring to reach a designated target zone. These bends cause the well bore to be somewhat like a roller coaster, which for a deep well, as for example 10,000 to 15,000 feet in depth, results in a great deal of friction between the relatively stiff drill string and the casing. Because of such friction rotating tool joints of the string can cause severe damage to the casing, and a combination of rotating and lineal pulling frictional stressing can cause very high surface power requirements, and even cause a failure of the drill string at depth. Because of similarly high frictional engagement between a fishing string and the casing wall, the part of the string remaining in the well may not be retrievable, and the costly well may be lost. An example of such a failure recently occurred in a well in the Torre platform in the Ekofisk field in the North Sea offshore from Norway. In that well a 9⅝ inch O.D. casing had been set to a depth of approximately 13,000 feet with a lateral displacement of approximately 7,000 feet, and an attempt was being made to drill an 8½ inch hole into a target production zone at about a 14,000 foot depth. The combination of rotational and lineal friction got so great that it exceeded the yield strength of the drill pipe, so that the drill pipe snapped at a depth of approximately 12,000 feet. The frictional stress would similarly have been too great on any state-of-the-art fishing equipment, so that the well was lost.

Under the current state of the art the amount of lateral displacement is limited to about 7,000 to 8,000 feet for a well depth of about 15,000 feet. However, currently there is large demand for directional wells having greater deflection angles and displacements, and greater depths, particularly to reduce the number of offshore platforms that are required in ocean floor drilling and production.

There have been numerous attempts in the prior art to reduce frictional wear and stress between well strings and well conduits containing such strings. Many of these attempts have utilized rollable bearing means such as ball bearings, roller bearings and wheels. However, none of these prior art antifriction systems has been particularly effective in reducing both lineal and rotational friction, while at the same time protecting a surrounding casing from damage by the string. Accordingly, under the present state of the art rollable bearing devices are not even used in drill strings, and protective rubber collars are clamped around the drill pipe just above every other tool joint (i.e., every 60 feet) to prevent the tool joints from frictionally damaging the casing. However, these protective rubber collars actually increase both the lineal and rotational frictional load between the string and the casing, thereby reducing the depth and lateral displacement achievable in drilling a well.

A protective device similar to the aforesaid rubber collar protector is disclosed in Rosser U.S. Pat. No. 3,948,575, and constitutes a resin collar that is molded around a drill pipe, with an outer surface that is slick for reduced friction.

Prior art rollable bearing devices which had direct contact between rollable bearing means and the casing wall were predominantly of the roller bearing type for good load distribution. While such rollable bearing antifriction devices were good for reducing rotational friction, they did not serve to materially reduce lineal friction. Examples of prior U.S. patents disclosing such direct contact roller bearing antifriction devices are Nos. 1,701,885 to Hardesty, 1,890,530 to Santiago, 1,923,328 to Reed, 1,905,158 to Craig et al, and 2,886,288 to Gehrke.

Most prior art ball bearing type antifriction devices used in connection with drill strings embodied ball bearingsupported outer collars which engaged the casing, and did not materially reduce lineal friction. Examples of prior U.S. patents of this type are Nos. 790,330 to Terry, 1,651,088 to Fentress, 1,756,195 to Holdaway, and 1,877,395 to Goeser.

Prior art disclosures of externally exposed antifriction balls in well devices utilized individually mounted balls that were not mounted for free flowing movement in an endless or continuous race. While such ball type antifriction devices did tend to reduce both rotational and lineal friction, the individual ball mounting still produced considerable friction both rotationally and lineally, and the individually mounted balls, being widely spaced apart, produced high pressure point contacts likely to damage casing or other surrounding tubing. Examples of prior U.S. patents disclosing structures of this type are Nos. 1,517,026 to Smith, where the individual balls were mounted in boxes joining sucker rods; 1,801,294 to Sutton, where the individual balls were positioned in tubular guide bearings on sucker rods; and 1,699,087 to Woodmansee, where the individual balls were mounted on a collar either on a drill pipe or on a sucker rod. Similar, noncirculating, and hence relatively high friction, ball bearing type devices capable of lineal antifriction action but inwardly exposed from a collar to a sucker rod were disclosed U.S. Pat. Nos. 1,566,451 to Vaughn and 2,127,796 to Willis; however, this type of collar was limited in its ball bearing engagement to a reciprocating type of device like a sucker rod, and had only a skid type of device for engaging the outer casing. Another type of lineal antifriction device was the longitudinally directed wheel, this being disclosed in U.S. Pat. Nos. 1,281,756 to Black and 1,827,835 also to Black; but these were only usable with sucker rods, and could not be used in connection with drill strings because the wheels extended through the diameters of the strings to both sides thereof.

SUMMARY OF THE INVENTION

In view of the foregoing problems in the art, it is a general object of the present invention to provide antifriction apparatus and method for well strings which minimizes both lineal and rotational friction, while at the same time protecting a surrounding casing or other conduit from damage by the string.

It is another general object of the invention to materially reduce the combination of lineal and rotational friction between a drill string, fishing string, or the like, and a well casing as compared to prior art apparatus and methods for the purpose, so as to enable greater lateral displacements and depths to be achieved in directional wells, and thereby enable a greater number of wells to be drilled and serviced from a single surface site.

It is accordingly another general object of the present invention to enable a greater number of directional wells to be drilled and serviced from a single offshore oil platform, thereby reducing the number of expensive offshore platforms that are required in the exploitation of an offshore oil field.

Another object of the invention is to provide an antifriction system for well strings, wherein lineal friction is minimized by longitudinally movable, recirculating, rollable bearing elements projecting radially from the outer surface of the string.

A further object of the invention is to provide an antifriction system for well strings which embodies both longitudinal and radial rollable bearing components, in each of which the rollable bearings, preferably ball bearings, are mounted for free flowing movement in an endless or continuous race.

A still further object of the invention is to provide an antifriction system for well strings wherein generally longitudinally arranged, recirculating rollable bearing elements are carried in a separate sub adapted to be connected between adjacent pipe lengths in a drill string.

Yet a further object of the invention is to provide an antifriction system of the character described wherein generally longitudinally arranged, recirculating rollable bearing elements are carried in segments of longitudinally split sleeve means adapted to be fastened around an elongated well string member.

According to the invention, a linear array of recirculating rollable bearing elements projects radially outwardly from a well string member and is generally longitudinally arranged so as to reduce lineal frictional engagement between the well string and surrounding casing or other confining tubular member. Preferably, the rollable bearing elements are ball bearings. At least three, and preferably four of these generally longitudinally arranged, linear arrays of recirculating rollable bearing elements are regularly spaced about the well string at a particular longitudinal location on the string, and preferably a plurality of such sets of linear arrays are disposed at regularly longitudinally spaced locations along the string. A sufficient number, as for example about ten, of the rollable bearing elements are provided in each linear array for distributing the bearing load and thereby minimizing both frictional stress and wear between well string elements and well conduits containing the strings.

In one disclosed form of the invention, both the longitudinal arrays of recirculating rollable bearing elements and annular arrays of continuously circulating rollable bearing elements are provided for minimizing both longitudinal and annular friction, which is desirable in rotating types of well strings such as drill strings. Another disclosed form of the invention is adapted for use with well strings such as sucker roads and wirelines which have predominantly longitudinal movement, this form of the invention omitting the annular arrays of rollable bearing elements, with ball bearings in the longitudinal arrays accommodating the predominantly lineal movement of the string, and providing adequate rotational antifriction action.

The generally longitudinally arranged, linear arrays of recirculating balls are provided in novel endless or continuous ball bearing races wherein the recirculating portion of each race slants inwardly from the outer cylindrical surface of the bearing cage through which the linear array is exposed, relative to what would be a chordal position.

BRIEF DESCRIPTION OF THE DRAWINGS

These and other objects of the invention will become more apparent in view of the following description taken in conjunction with the drawings, wherein:

FIG. 4 is a further enlarged transverse section, with portions shown in elevation, taken on the line 4—4 in FIG. 3;

FIG. 5 is a fragmentary longitudinal section, partly in elevation, and with a portion broken away, taken on the line 5—5 in FIG. 4;

FIG. 6 is a transverse section taken on the line 6—6 in FIG. 3;

FIG. 7 is an axial longitudinal section, with portions in elevation, illustrating another form of the present invention wherein the annular arrays of rollable bearing elements are omitted; and FIG. 8 is a transverse section taken on the line 8—8 in FIG. 7.

DETAILED DESCRIPTION

FIGS. 1-6 of the drawings illustrate the ball bearing antifriction system of the present invention embodied in a sub generally designated 10 which is adapted to be coupled between adjacent tool joint members in a well drill string.

Figure 1:
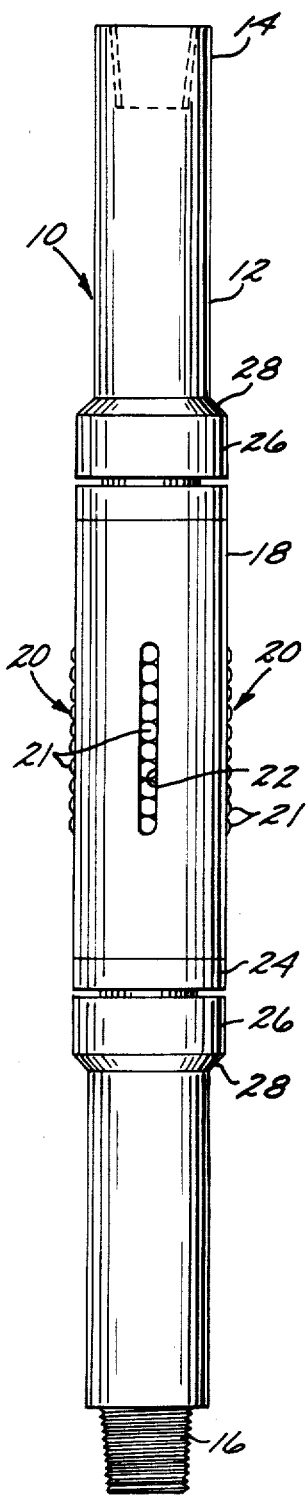
FIG. 1 is a side elevational view illustrating a drill string sub embodying the present recirculating rollable bearing antifriction system.

Referring at first to FIG. 1, the ball bearing sub 10 has an elongated body in the form of a tubular mandrel which, for strength, is preferably of unitary construction. A tool joint box 14 is provided at the upper end of mandrel 12, and a tool joint pin 16 is provided at the lower end of mandrel 12. An elongated, tubular ball bearing cage 18 is coaxially rotatably supported on the central portion of mandrel 12, the cage 18 being restrained against longitudinal movement relative to mandrel 12.

A plurality of linear arrays 20 of recirculating balls project radially outwardly from the ball bearing cage 18 and constitute the largest radial extent of the ball bearing sub 10. At least three, and preferably four, of these linear arrays 20 of recirculating balls are regularly spaced around the cage 18, with each of the arrays 20 of balls preferably being parallel to the longitudinal axis of the sub 10. The individual balls 21 of the linear arrays 20 are contained in endless or continuous races in the cage 18 for recirculation, and hence for optimum freedom of longitudinal motion in the linear arrays 20.

The balls 21 in each of the linear arrays 20 are exposed through a respective longitudinally arranged, undercut slot 22 forming a part of the respective endless recirculating ball race in cage 18. Although the present invention is not limited to any particular number of balls 21 in each of the exposed linear arrays 20, it is preferred that at least about ten individual balls 21 be exposed in each of the linear arrays so that the engaging forces of the arrays 20 against the inner surface of a well casing will be spread out over a substantial area of the casing, thereby minimizing pressure of individual balls 21 on the casing and reducing rolling friction of the balls. As best seen in FIGS. 4 and 6 of the drawings, in operation two of the linear arrays 20 of balls 21 will normally engage the casing, so that with ten balls 21 in each array 20 the load will be spread out over twenty of the individual balls 21.

Figure 3:
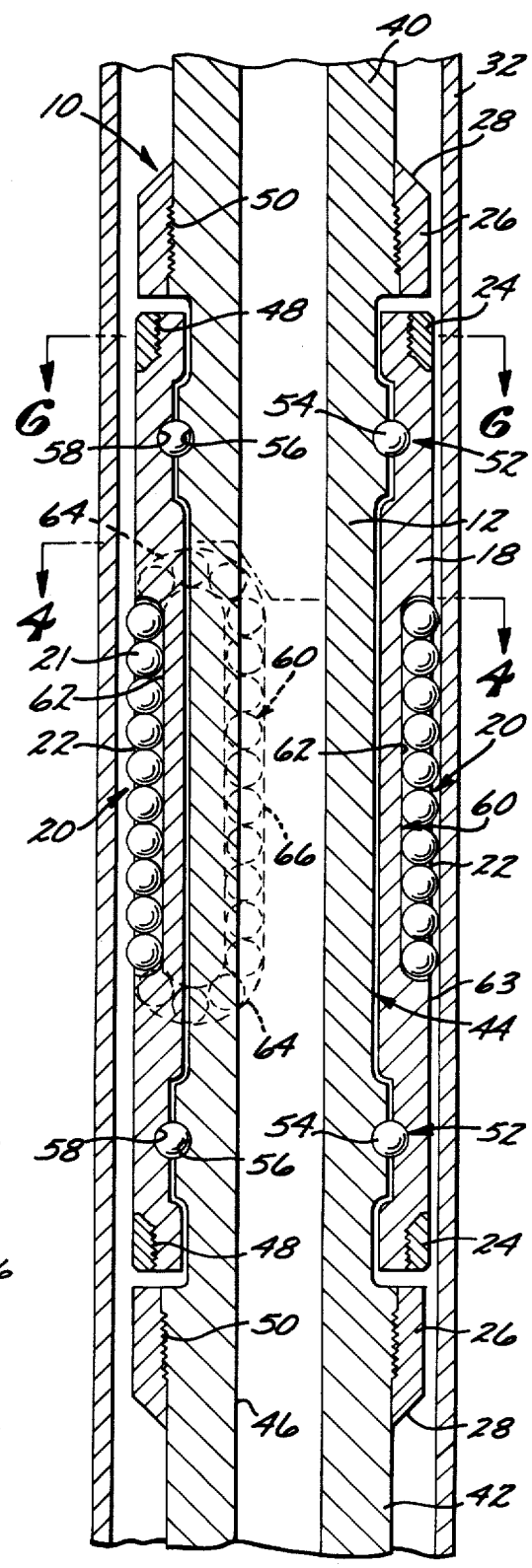
FIG. 3 is an enlarged, fragmentary, axial longitudinal section, with portions in elevation, taken on the line 3—3 in FIG. 2.

The ball bearing cage 18 is preferably of split sleeve construction, comprising two generally semicylindrical portions 18a and 18b to simplify construction and assembly of the sub 10. This split sleeve type construction is best seen in FIGS. 4 and 6. The two halves of cage 18 are preferably secured together by a pair of lock rings 24 located at the ends of cage 18 as best seen in FIGS. 1, 3 and 6, although it is to be understood that the cage portions 18a and 18b may be otherwise secured together, as for example by welding or other conventional means.

A guide ring 26 is mounted on the mandrel 12 adjacent each end of the ball bearing cage 18 to protect the cage 18 against longitudinal impacting in operation. Each of the guide rings 26 has an inclined, frustoconical ramp 28 facing the respective end of the sub 10 to prevent the radially outwardly stepped part of the sub from catching on obstructions as the sub 10 is moved longitudinally in a well.

Figure 2:
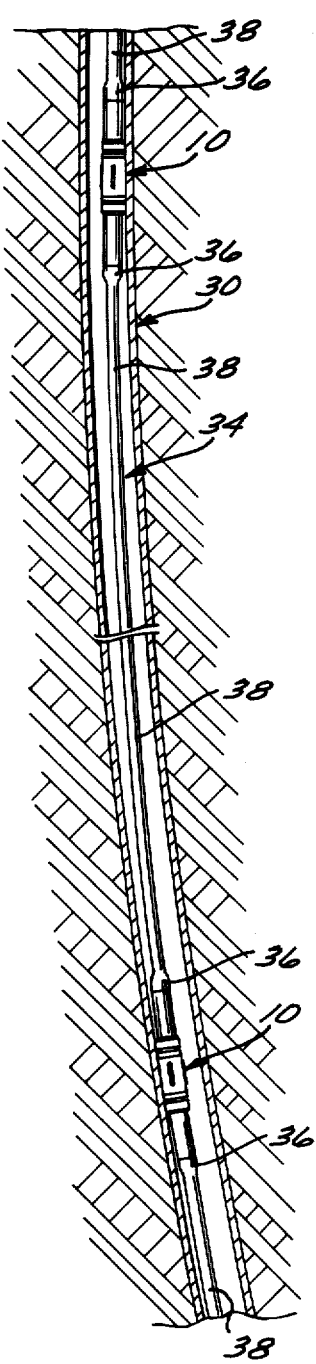
FIG. 2 is a fragmentary vertical section, partly in elevation, with portions broken away, illustrating a bent portion of a directional well through which a drill string extends, the string embodying a series of antifriction subs of the present invention like that shown in FIG. 1.

As described above in the Summary of the Invention, a series of the ball bearing subs 10 of the present invention is disposed at regularly spaced intervals in a drill string so as to minimize rotational torque, longitudinal stress, and resulting severe wear on the casing, which would otherwise be caused by frictional contact of tool joints in the string against the inside of the well casing, particularly in curving portions of "slant" or "directional" wells of great depth and wide lateral displacement. FIG. 2 illustrates a bent or curved portion 30 of such a "slant" or "directional" well which is lined with a casing 32 and has a drill string 34 embodying a series of ball bearing subs 10 of the invention at regularly spaced intervals therein. Although the ball bearing subs 10 may be arranged in drill string 34 between any desired number of drill pipe lengths, for normal directional well curvatures it will be sufficient to have one of the ball bearing subs 10 between each ninety-foot stand or setback of three thirty-foot pipe singles, without the two intermediate tool joints coming into frictional engagement with the casing. Thus, for example, in a drill string 34 employed in a very deep directional well having about 10,000 to 15,000 feet of casing there would be from about 110 to about 165 units of the present invention regularly spaced at ninety-foot intervals along the string.

As seen in FIG. 2, in a bent portion 30 of a well, spaced units 10 of the present invention will engage the casing 32 at different circumferential locations. Thus, in FIG. 2 an upper ball bearing sub 10 of the invention is seen engaging the right-hand side of casing 32, while a lower ball bearing sub 10 of the invention is seen engaging the left-hand side of casing 32. It will be noted that the portion of drill string 34 intermediate these two subs 10 is spaced substantially from the casing 32, so that tool joints in such intermediate portion of the string will not tend to frictionally engage the casing. In straight portions of a well the greater diameters of the regularly spaced ball bearing subs than the diameters of the tool joints in the string will also assure against frictional engagement of the tool joints against the casing.

FIG. 2 also illustrates the operative connections of the tool joint box 14 and tool joint pin 16 on the ends of mandrel 12 with respective mating tool joint members 36 at the ends of drill pipe lengths 38.

Referring now particularly to FIGS. 3–6, the mandrel 12 comprises respective upper and lower end portions 40 and 42 leading to respective tool joint box 14 and pin 16; and a central portion 44 upon which the ball bearing cage 18 is supported. An axial passage 46 extends through the entire length of the mandrel 12 for the passage therethrough of fluids, wireline equipment, and the like. The passage 46 is preferably at least about 2½ inches in diameter for a ball bearing sub 10 adapted to be used in a drill string.

As seen in FIG. 3, the lock rings 24 may be connected to end portions of the assembled cage halves 18a and 18b by thread means 48. Lock rings 24 may alternatively be connected to end portions of cage 18 by other conventional means, as for example welding, brazing, pinning, or the like. Each of the guide rings 26 is preferably coupled to the mandrel 12 by means of a respective threaded connection 50. This enables the two halves 18a and 18b of ball bearing cage 18 to be assembled on the central portion 44 of mandrel 12 and the lock rings 48 slid over the respective end portions 40 and 42 of mandrel 12 and coupled to the ends of cage 18 before the guide rings 26 are installed; and then the guide rings 26 may be slid over the respective end portions 40 and 42 of mandrel 12 and threadedly engaged on the mandrel 12 in their operative positions as shown in FIG. 3.

Rotational antifriction connections generally designated 52 are provided between the mandrel 12 and the ball bearing cage 18 proximate the respective ends of cage 18. These rotational antifriction connections 52 are preferably annular ball bearing connections as shown, because this type of antifriction connection provides not only rotational freedom of movement, but also provides for axial thrust between the cage 18 and the mandrel 12, and further provides assurance of longitudinal alignment between the two halves 18a and 18b of the longitudinally split cage 18. It will be apparent, however, that other types of rotational antifriction means may be employed between mandrel 12 and cage 18, as for example roller or needle bearing means. The preferred ball bearing rotational antifriction connections 52 each comprise an annular array of ball bearings 54 which ride in opposing annular ball bearing races 56 and 58 in mandrel 12 and cage 18, respectively.

Each of the four endless or continuous ball bearing races for the recirculating balls 21 is generally designated 60, and is of oval configuration elongated in the longitudinal direction of the sub 10. Each of the endless ball bearing races 60 comprises a straight, longitudinally arranged outer channel portion 62 which has a depth in the radial direction of sub 10 intermediate the radii of balls 21 and the diameters of balls 21, so that a portion of each of the balls 21 in the straight outer channel portion 62 of ball bearing race 60 will be exposed beyond the outer cylindrical surface 63 of cage 18. The slots 22 through which the respective linear arrays 20 of balls 21 project are thus the openings or windows of the respective straight outer channel portions 62 of the respective endless ball bearing races 60.

Communicating with each end of the straight outer channel portion 62 of each endless ball bearing race 60 is a 180° arcuate tubular end portion 64 of the race 60. Each of these arcuate tubular end portions 64 of each race 60 slants inwardly from the outer cylindrical surface 63 of cage 18 relative to what would be a chordal position, as best seen in FIG. 4, and communicates at its inner end with a respective straight end of a straight inner return portion 66 of the respective endless ball bearing race 60. Thus, the ball bearings 21 in each of the endless races 60 are enabled to freely circulate through the respective race 60 as a result of vertical movement of the drill string 34 with the exposed linear array 20 of balls 21 engaged against the casing 32 as seen at the right-hand sides of FIGS. 3, 4 and 6, and at the bottoms of FIGS. 4 and 6. Such circulation of the balls 21 in an endless race 60 will be in either direction through the straight outer channel portion 62, around one of the arcuate end portions 64, in the opposite direction along the straight inner return portion 66, and then back around the other arcuate end portion 64 and back into the straight outer channel portion 62.

Preferably at least about a ¼ inch diametrical "drift" or clearance is provided between the ball bearing sub 10 and the casing 32 at the linear arrays 20 of balls 21. By way of example only, and not of limitation, where a 9⅝ inch O.D. casing is employed in a well, with a casing I.D. of approximately 8¾ inches, suitable dimensions for the ball bearing sub 10 are an 8-inch O.D. for the outer cylindrical surface 63 of ball bearing cage 18, with the balls 21 having a one-inch diameter and having ¼ inch thereof radially exposed in the linear arrays 20. Conventional five-inch O.D. drill pipe has tool joints with an O.D. of approximately 6⅝ inches. The 8½ inch diameter of ball bearing sub 10 between opposed linear arrays 20 of the balls 21 would then be 2⅛ inches larger in diameter than the tool joints of the drill string, which provides adequate separation of the tool joints from the casing in a bent portion of the well in which two linear arrays 20 of balls 21 are engaged against one side of the casing as best illustrated in FIGS. 4 and 6 of the drawings.

While the recirculating balls 21 are primarily adapted to provide freedom of lineal travel of a well string, they also provide some rotational freedom. Where the well string is a drill string such as the drill string 34 illustrated in FIG. 2, where rotational speeds of from about 40 r.p.m. to about 350 r.p.m. are expected, it is preferable to employ the additional rotationsl antifriction connections 52. However, in other types of well strings, such as sucker rod strings or wireline strings, fishing strings, and the like where movement is predominantly lineal rather than rotational, the linear arrays 20 of recirculating balls provide adequate rotational freedom of movement without the need for additional rotational antifriction connections such as the connections 52. FIGS. 7 and 8 illustrate such a form of the invention.

Referring to FIGS. 7 and 8, the ball bearing antifriction system of the present invention is shown applied to a well string element 68 which is diagrammatically represented as a solid elongated element but which may be either solid or tubular, and may be a sucker rod, wireline, fishing, or other elongated well string element that has primarily longitudinal movement and only limited rotational movement in the well. In this form of the invention the longitudinally split ball bearing cage 70, comprising semicylindrical halves 70a and 70b, is directly clamped about the periphery of the the well string element 68 by tightenable clamp rings 72 or other suitable clamping means proximate the respective upper and lower ends of cage 70. Tapered threaded connections 74 between clamp rings 72 and cage 70 enable secure clamping of the cage halves 70a and 70b against the well string element 68 to be effected.

At least three, and preferably four as shown, endless or continuous ball bearing races 60a are provided in cage 70, presenting respective exposed linear arrays 20a of recirculating balls which are regularly spaced about the periphery of cage 70. The endless ball bearing races 60a and their respective exposed linear arrays 20a of recirculating balls may be of the same construction as the corresponding endless balls bearing races 60 and linear arrays 20 of recirculating balls shown in FIGS. 1–6, and described in detail in connection therewith. However, it is to be understood that the diameters of such well string elements as sucker rods or wirelines are typically much smaller than the diameters of drill pipe tool joints, so that forms of the present invention applied to such smaller well string elements will be miniaturized relative to the drill string form of the invention shown in FIGS. 1–6.

If desired, a form of the present invention like that shown in FIGS. 1–6 which embodies rotational antifriction connections between the mandrel and linear ball bearing cage may be directly clamped onto a well string element, including a length of drill pipe, in a manner similar to the direct clamping illustrated in FIG. 7 of the ball bearing cage 70 on the well string element 68. This may be accomplished by providing a mandrel like mandrel 12 but without the tool joint end portions 14 and 16, and with an axial passage 46 therethrough which has approximately the same diameter as the well string element to which the antifriction system is being applied, as for example about a five-inch diameter for attachment over a drill string element. The mandrel is then made in two generally semicylindrical half sections, which are clamped against the drill pipe, and then the halves 18a and 18b of longitudinally split cage 18 are assembled on the mandrel as in the form of the invention shown in FIGS. 1–6.

While the invention has been particularly shown and described with reference to preferred embodiments thereof, it will be understood by those skilled in the art that various changes in form and details may be made therein without departing from the spirit and scope of the invention.

I claim:

1. Apparatus for reducing friction between a well string and a well conduit containing such string which comprises:

a plurality of linear arrays of rollable bearing elements exposed on the outside of said string, each of said arrays being generally longitudinally oriented on said string, a plurality of endless bearing races in said string, said rollable bearing elements of each of said arrays being contained for free flowing movement in a respective said race, said arrays and their respective races being located at regularly spaced intervals about said string at a substantially common longitudinal position on said string, generally cylindrical cage means within which said bearing races are contained, said cage means being peripherally located on said well string, and generally cylindrical mandrel means on said string, said mandrel means being generally coaxial within said cage means, and annular rollable bearing means engaged between said cage means and said mandrel means.

2. Apparatus as defined in claim 1, wherein said string is a drill string.

3. Apparatus as defined in claim 2, wherein said mandrel means has tool joint members on its ends for connection with respective mating tool joint members on adjacent drill pipe lengths in said string.

4. Apparatus for reducing friction between a well string and a well conduit containing such string which comprises:

a plurality of linear arrays of rollable bearing elements exposed on the outside of said string, each of said arrays being generally longitudinally oriented on said string, a plurality of endless bearing races in said string, said rollable bearing elements of each of said arrays being contained for free flowing movement in a respective said race, said arrays and their respective races being located at regularly spaced intervals about said string at a substantially common longitudinal position on said string, and generally cylindrical cage means within which said bearing races are contained, said cage means being peripherally located on said well string and said cage means being longitudinally split for assembly on said well string.

* * * * *